(12) United States Patent
Hou et al.

(10) Patent No.: US 6,441,961 B1
(45) Date of Patent: Aug. 27, 2002

(54) FOLDED OPTICAL INTERLEAVER WITH OPTIONAL ROUTING CAPABILITY

(75) Inventors: Hongtao Hou, Santa Clara; Qin Zhang, San Jose, both of CA (US)

(73) Assignee: Oplink Communications, Inc., San Jose, CA (US)

( * ) Notice: Subject to any disclaimer, the term of this patent is extended or adjusted under 35 U.S.C. 154(b) by 92 days.

(21) Appl. No.: 09/702,962

(22) Filed: Oct. 30, 2000

(51) Int. Cl.[7] .............................................. G02B 27/28
(52) U.S. Cl. ........................ 359/497; 359/117; 359/128
(58) Field of Search ............................. 385/11, 24, 27; 359/122, 128, 117, 114, 126, 115, 497, 498, 484, 124, 127; 349/18

(56) References Cited

U.S. PATENT DOCUMENTS

| | | | | |
|---|---|---|---|---|
| 5,694,233 A | * | 12/1997 | Wu et al. | 359/117 |
| 5,724,165 A | * | 3/1998 | Wu | 359/117 |
| 6,212,313 B1 | * | 4/2001 | Li | 359/117 |

* cited by examiner

Primary Examiner—Cassandra Spyrou
Assistant Examiner—Arnel C. Lavarias
(74) Attorney, Agent, or Firm—Lumen Intellectual Property Services, Inc.

(57) ABSTRACT

An optical interleaver apparatus and method are disclosed. The apparatus comprises a first birefringent element, a first waveplate, a second birefringent element, a polarization rotation device and a retro-reflector. The first birefringent element separates an input optical signal into first and second beams having complementary polarizations. The first waveplate rotates a polarization of light in a first wavelength range, but not a second wavelength range. The second birefringent element splits the first and second beams into third, fourth, fifth and sixth beams. The polarization rotation device and retro-reflector are configured such that, on a reverse path, the second birefringent element combines the third beam with the sixth beam and the fourth beam with the fifth beam. The inventive apparatus may operate as either a demultiplexer or multiplexer. In an alternative embodiment, the apparatus includes a switchable polarization rotator disposed between the first birefringent element and the first waveplate. The switchable polarization rotator allows the apparatus to operate as a router by either rotating or not rotating the polarizations of the first and second beams.

25 Claims, 12 Drawing Sheets

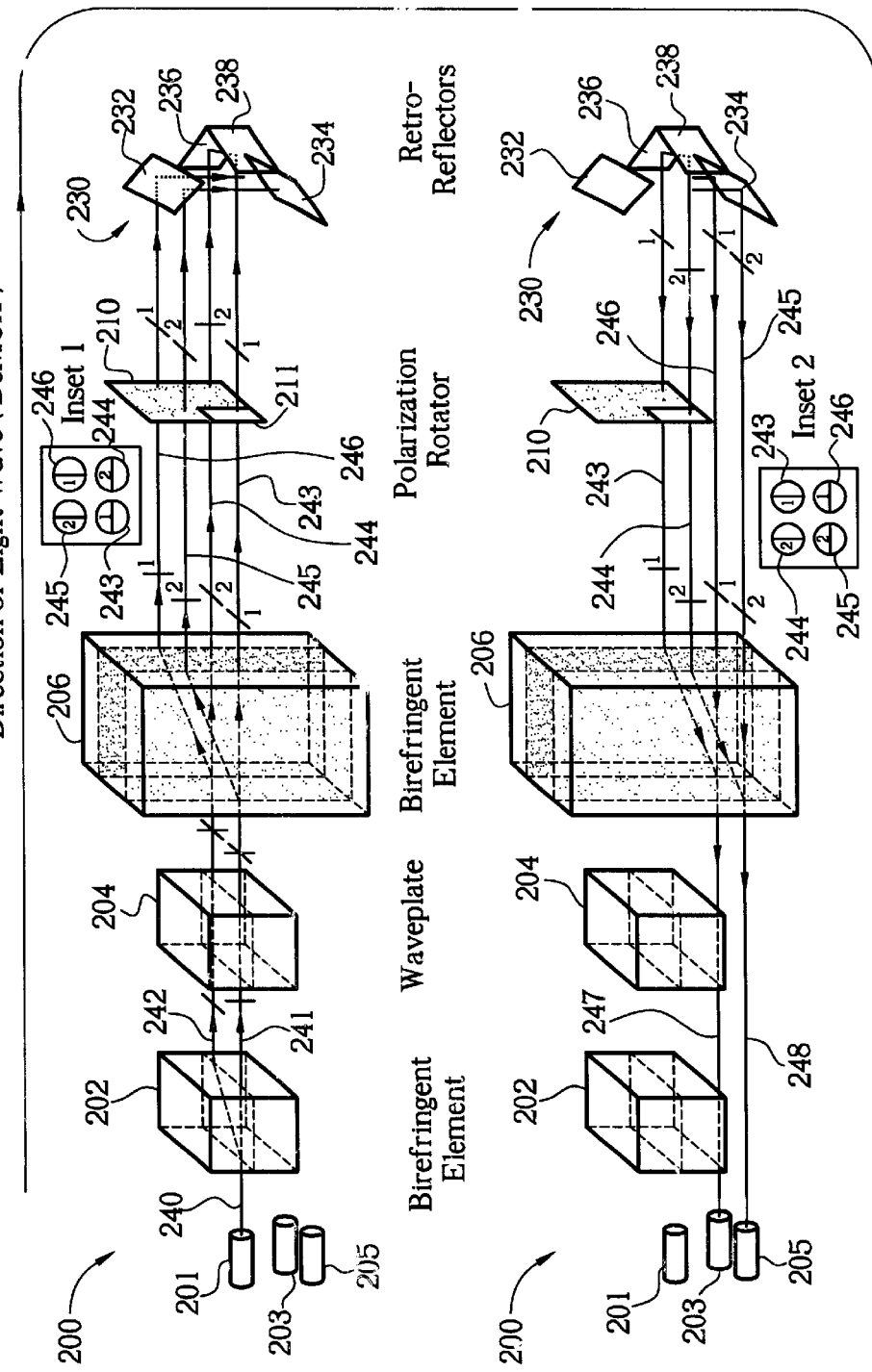

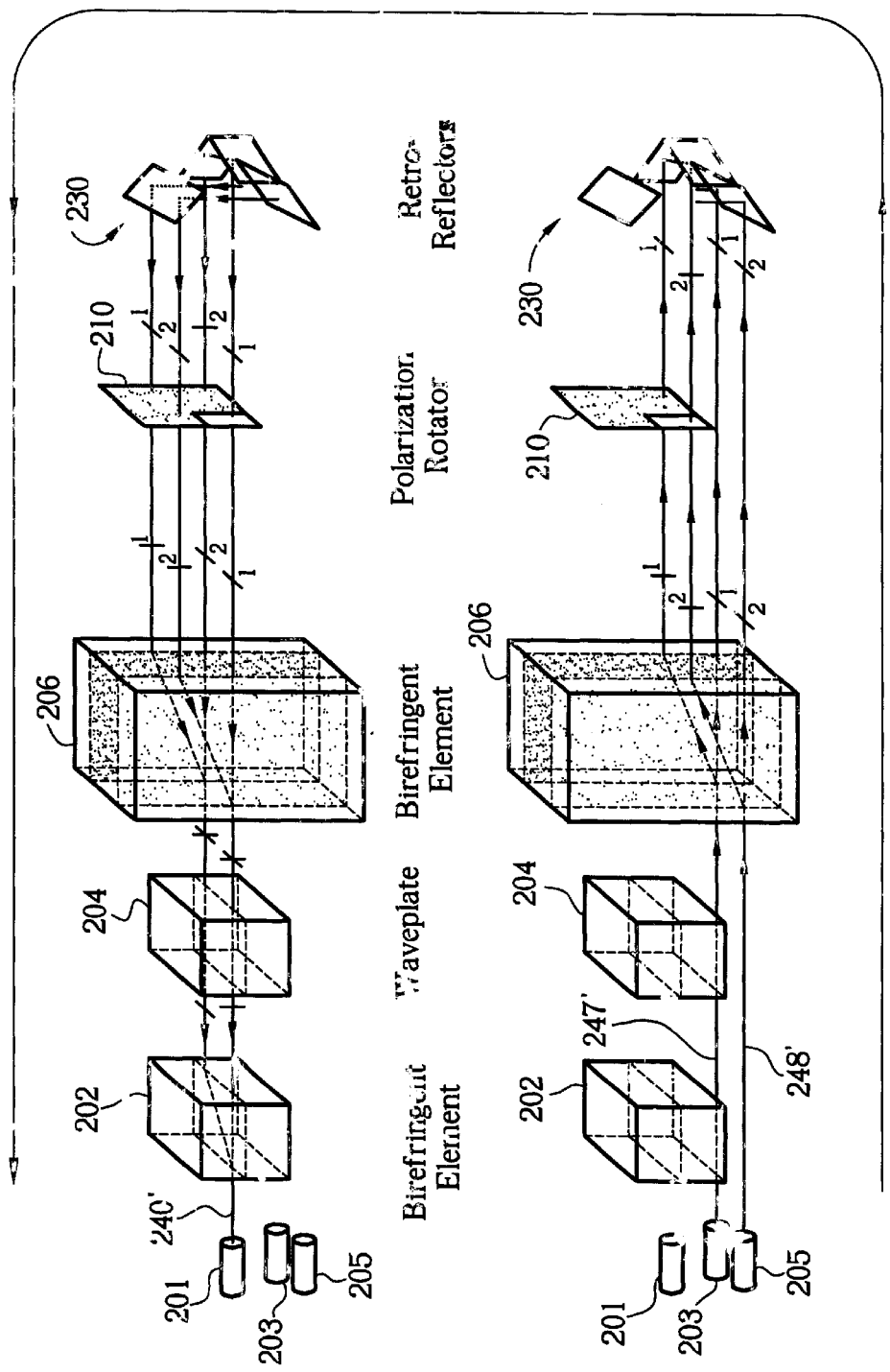

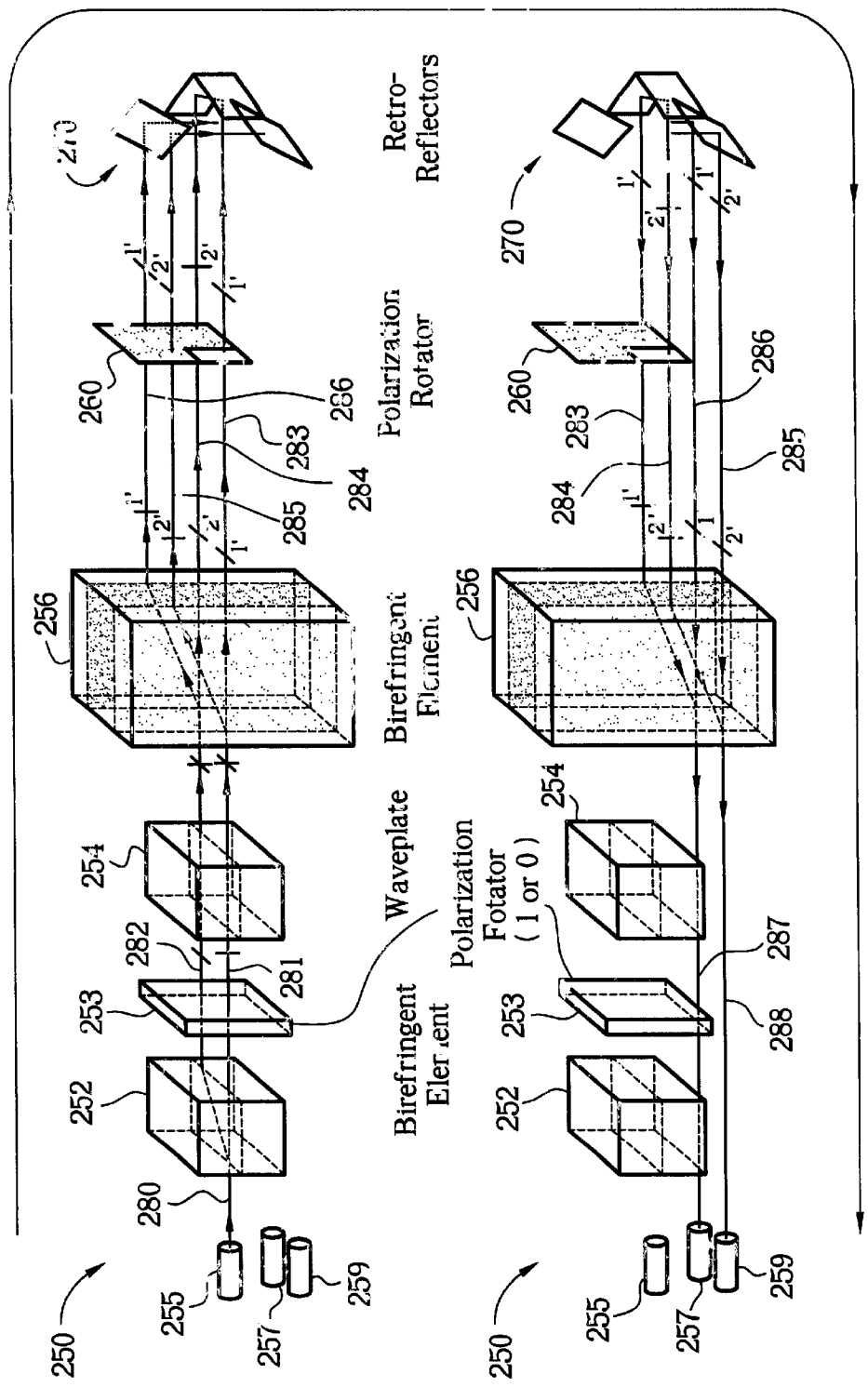

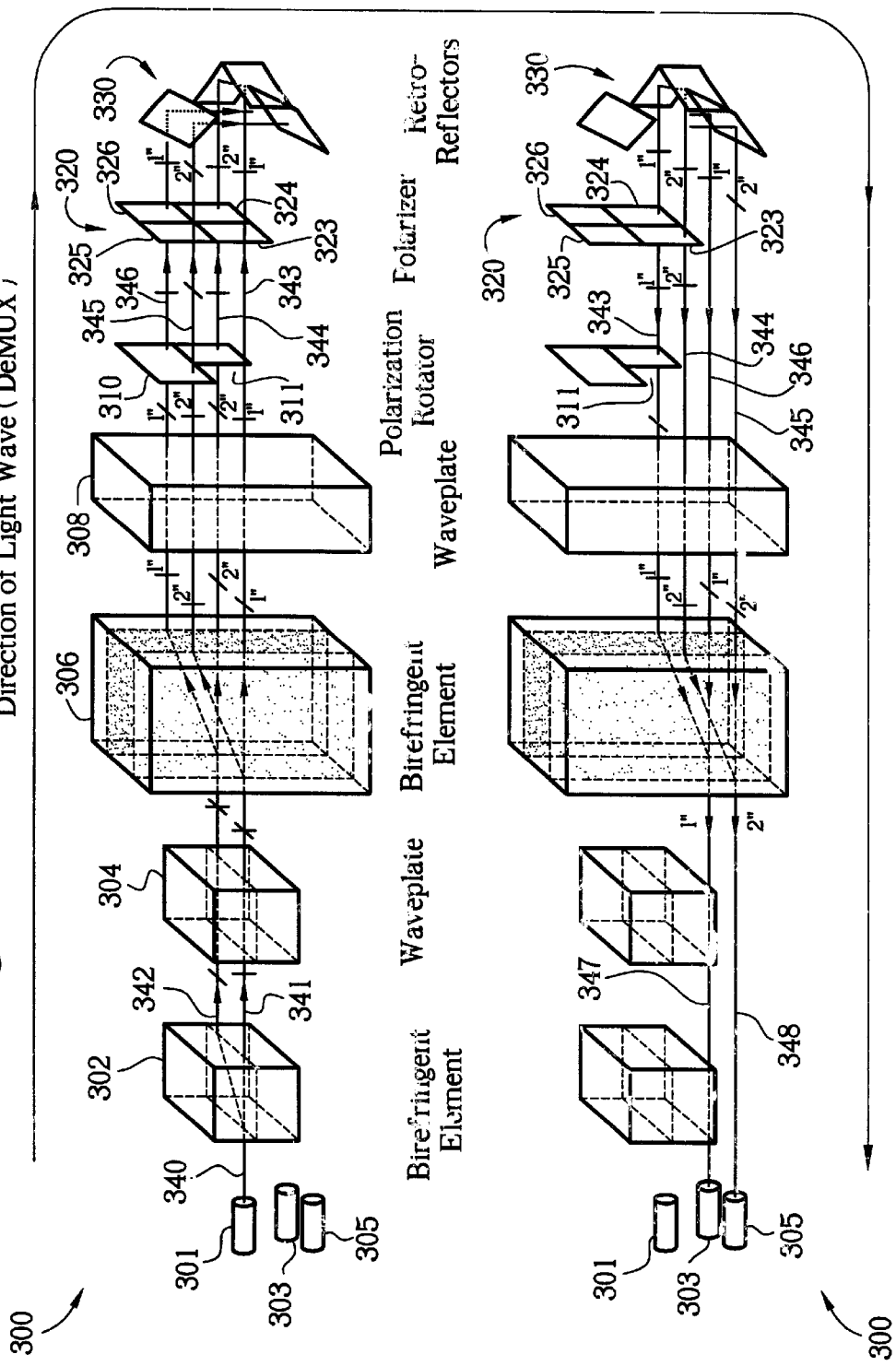

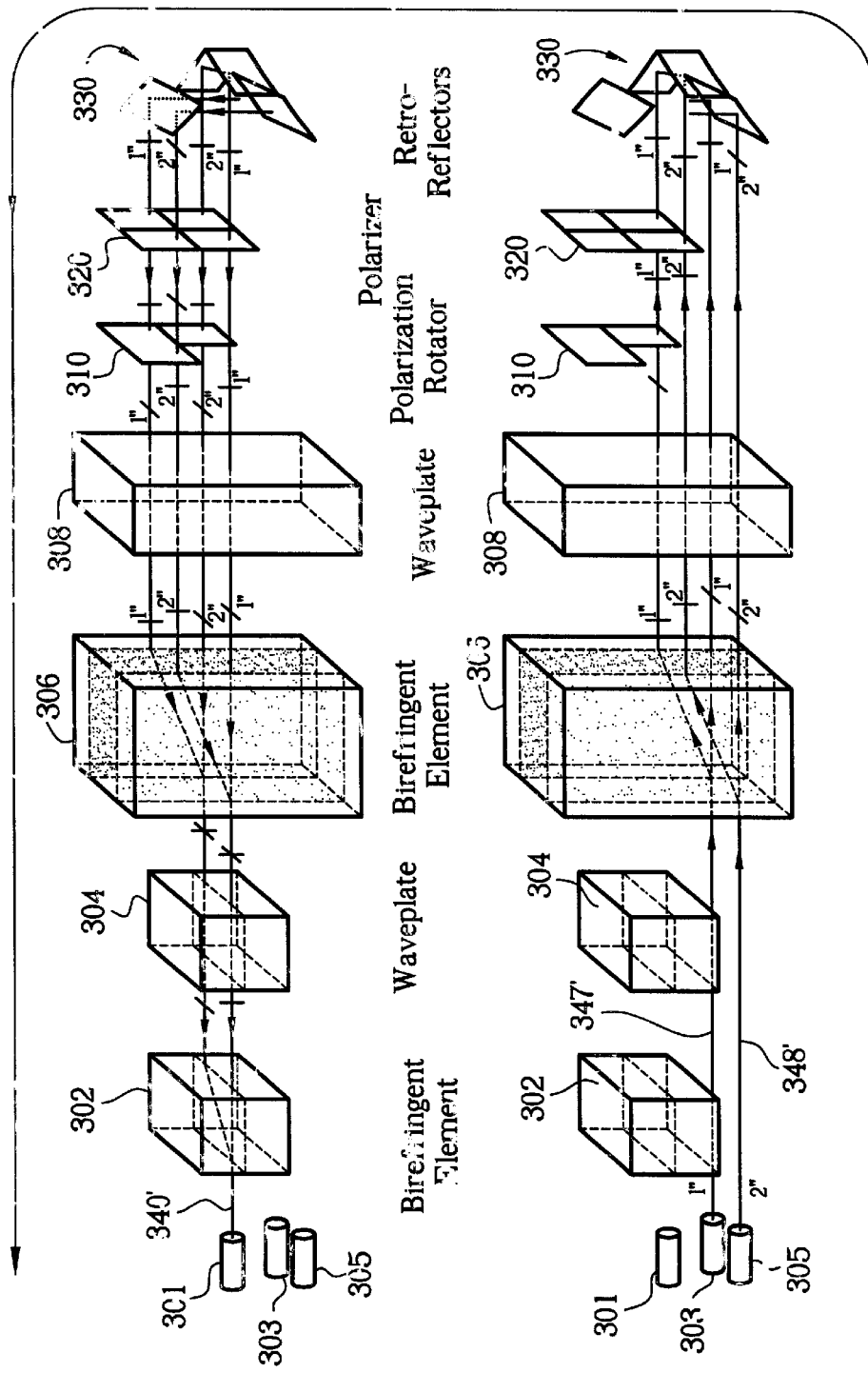

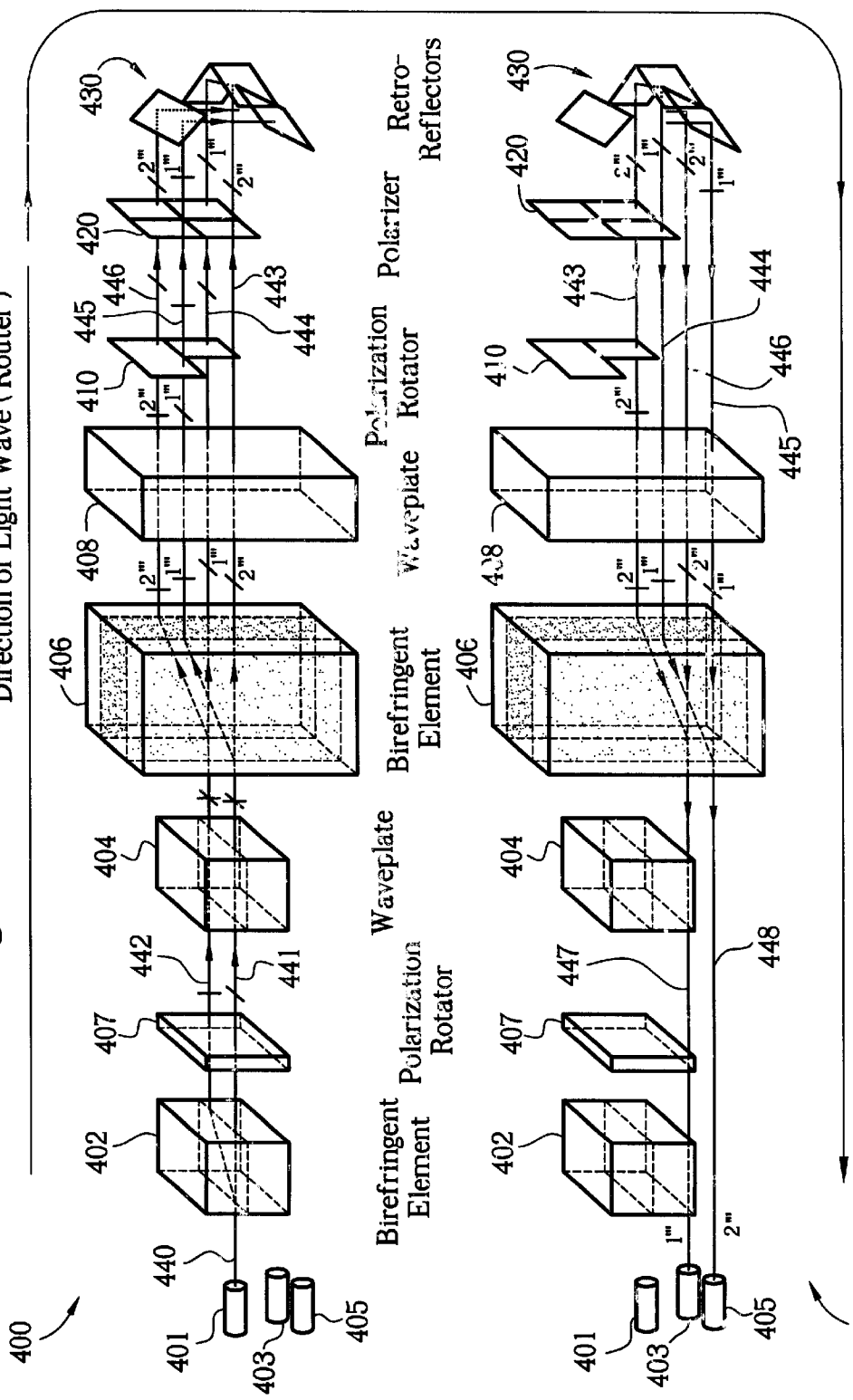
Fig. 4A / Fig. 4B

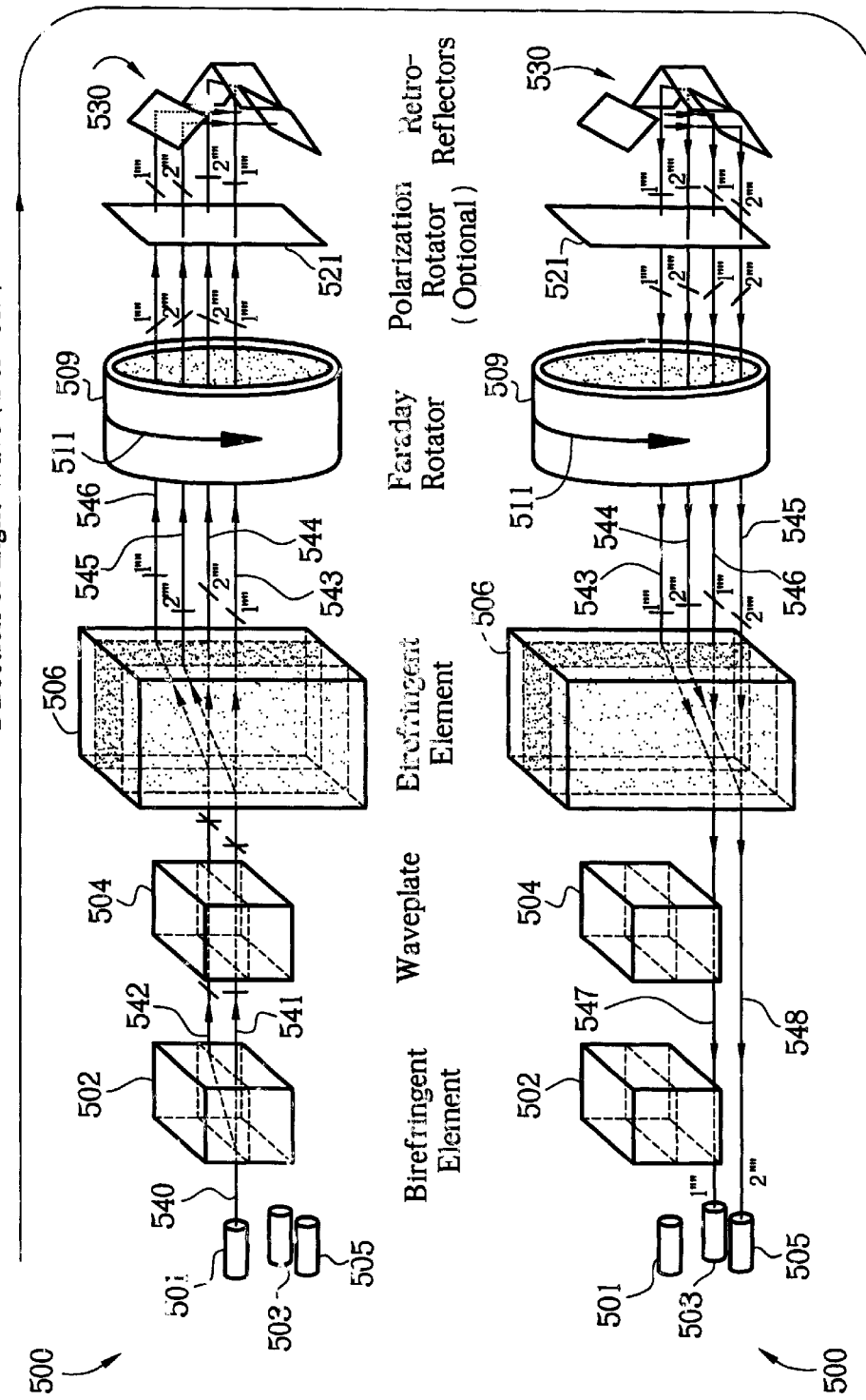

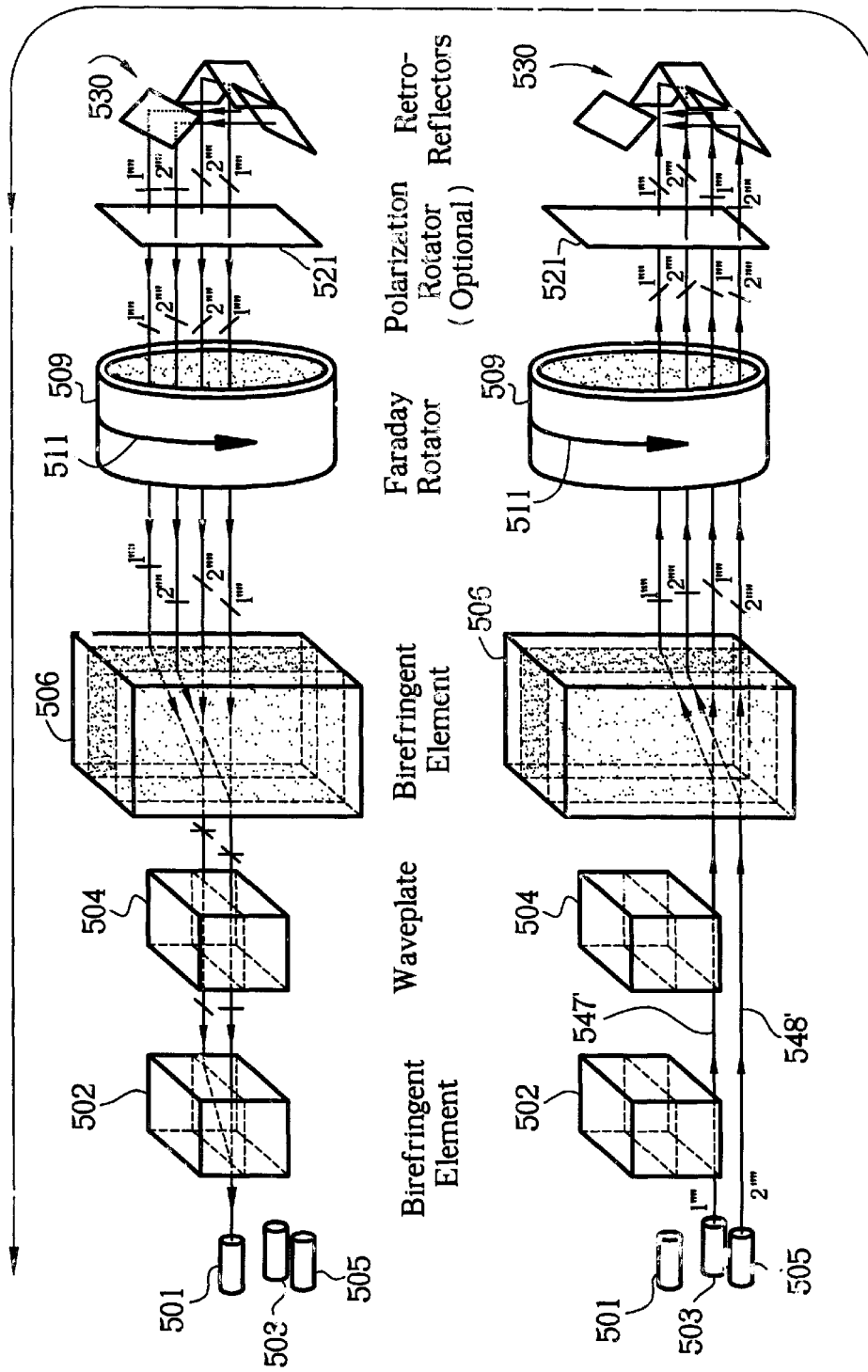

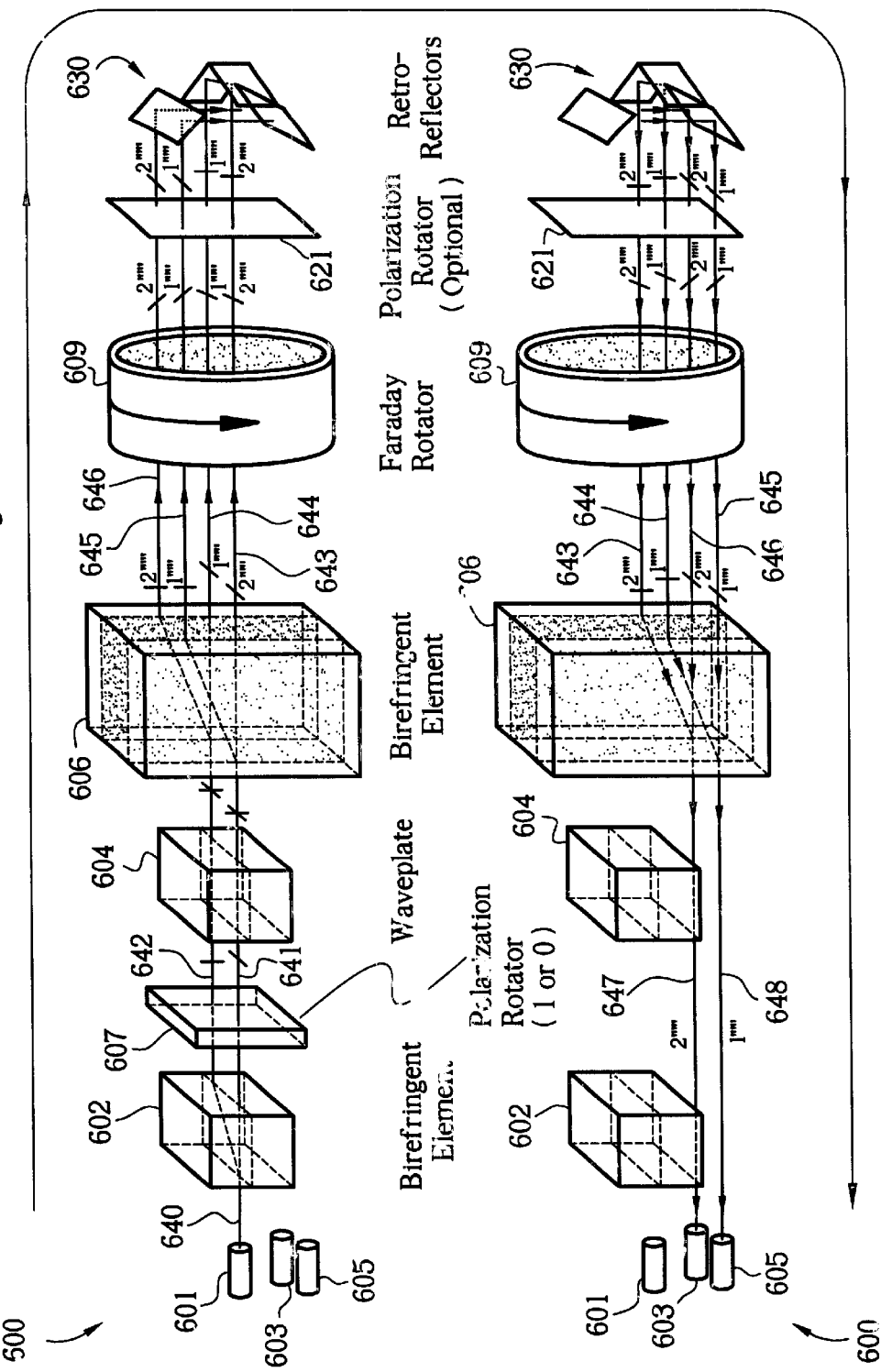

US 6,441,961 B1

FOLDED OPTICAL INTERLEAVER WITH OPTIONAL ROUTING CAPABILITY

FIELD OF THE INVENTION

This invention relates generally to optical communication. More particularly, it relates to optical switches for wavelength division multiplexing.

BACKGROUND ART

Optical wavelength division multiplexing (WDM) has gradually become the standard backbone network for fiber optic communication systems. WDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM technology.

WDM systems use components referred to generically as optical interleavers to combine, split, or route optical signals of different channels. Interleavers typically fall into one of three categories, multiplexers, de-multiplexers and routers. A multiplexer takes optical signals of different channels from two or more different input ports and combines them so that they may be coupled to an output port for transmission over a single optical fiber. A de-multiplexer divides a signal containing two or more different channels according to their wavelength ranges and directs each channel to a different dedicated fiber. An optical interleaver can spatially separate dense WDM (DWDM) or ultra-dense WDM (UWDM) signals into two complementary subsets, each having twice the original channel spacing. A router works much the same way as a de-multiplexer. However a router can selectively direct each channel according to control signals to a desired coupling between an input channel and an output port.

FIG. 1 depicts a typical optical interleaver 999 of the prior art as described in U.S. Pat. No. 5,694,233, issued to Wu et al. on Dec. 2, 1997. A WDM signal 90 containing two different channels 91, 92 enters interleaver 999 at an input port 11. A first birefringent element 30 spatially separates WDM signal 90 into horizontal and vertically polarized components 101 and 102 by a horizontal walk-off. Each of component signals 101 and 102 carries the full frequency spectrum of WDM signal 90.

Components 101 and 102 couple to a polarization rotator 40, which selectively rotates the polarization state of either signal 101 or 102 by a predefined amount. For example, rotator 40 rotates signal 102 by 90° so that signals 103, 104 are both horizontally polarized as they exit rotator 40 and enter a wavelength filter 61.

Wavelength filter 61 selectively rotates the polarization of wavelengths in either the first or second channel to produce filtered signals 105 and 106. For example wavelength filter 61 rotates wavelengths in the first channel 91 by 90° but not the second channel 92. The filtered signals 105 and 106 enter a second birefringent element 50 that vertically walks off the first channel into beams 107, 108. The second channel forms beams 109, 110.

A second wavelength filter 62 then selectively rotates the polarizations of signals 107, 108 but not signals 109, 110 thereby producing signals 111, 112, 113, 114, having polarizations that are parallel each other. A second polarization rotator 41 then rotates the polarizations of signals 111 and 113, but not 112 and 114. The resulting signals 115, 116, 117, and 118 then enter a third birefringent element 70. Second wavelength filter 62 may alternatively be replaced by a polarization rotator 41 suitably configured to rotate the polarizations of signals 111, 113 but not 112, 114.

Third birefringent element 70 combines signals 115 and 116, into the first channel, which is coupled to output port 14. Birefringent element 70 also combines signals 117 and 118 into the second channel, which is coupled into output port 13.

As described above, interleaver 999 operates as a de-multiplexer. By operating interleaver 999 in reverse, i.e., starting with channels 91, 92 at ports 13 and 14 respectively, interleaver operates as a multiplexer. Furthermore, by suitably controlling the polarization rotation induced by rotators 40 and 41, interleaver 999 may be configured to operate as a router.

Interleaver 999 has certain drawbacks. First, each port requires its own collimator. Three collimators take up space and require a relatively large walk-off distance for the signals. Consequently, birefringent elements 30, 50 and 70 tend to be both long and wide. Second, the number of components, particularly birefringent elements, tends to make interleaver 999 bulky, expensive and more massive. Generally, as the mass of interleaver 999 increases, its operation becomes more unstable. Third, the coupling distance, i.e., the distance between port 11 and ports 13, 14, tends to be long, which increases insertion losses in interleaver 999. Furthermore, each of the ports 11, 13 and 14 requires a separate collimator to couple the signals into and out of optical fibers. This adds to the complexity and expense of interleaver 999.

Passband wavelength accuracy and channel isolation are important in DWDM and UWDM applications. For accurate passband wavelength, typically 1% of channel spacing, it is necessary to produce wavelength filters with a length that is accurate to within 1% of the wavelength. Furthermore, the angle between the optic axis of the filter and the polarization of the signal must be carefully controlled. These two requirements increase the cost of current interleavers.

Using a folding design can reduce the complexity and expense of an interleaver. A folding design follows the same general principles as interleaver 999 but uses only two birefringent crystals instead of three. A reflector coupled to the second birefringent crystal reflects the light back through the interleaver elements along a reverse path. Thus, the interleaver elements are fewer and can be made smaller, thereby saving space, complexity and cost.

Unfortunately, even folding designs have drawbacks. One of these drawbacks is that in order to assure proper multiplexing, demultiplexing, or routing, beams containing light in the same wavelength range must be on the same "side" of the interleaver to be properly combined. The prior art uses complex polarization rotation schemes and wavelength filters to accomplish this. Unfortunately, these rotation schemes and wavelength filters add to the manufacturing cost of the interleaver and introduce additional insertion losses.

There is a need, therefore, for an improved optical interleaver that overcomes the above difficulties.

OBJECTS AND ADVANTAGES

Accordingly, it is a primary object of the present invention to provide a folded optical interleaver that uses fewer and/or smaller birefringent elements than in previous designs. It is a further object of the invention to provide a folded interleaver having a routing capability implemented by a single polarization rotation element.

SUMMARY

The above objects and advantages are attained by an inventive optical interleaver apparatus and method. The apparatus comprises a first birefringent element, a first waveplate, a second birefringent element, a polarization rotation device and a retro-reflector. An optic axis of the first birefringent element is oriented such that the first birefringent element separates an input optical signal into first and second beams having complementary polarizations. The first waveplate is optically coupled to the first birefringent element. The first waveplate rotates a polarization of light in a first wavelength range, but not a second wavelength range. The second birefringent element is optically coupled to the first waveplate. The second birefringent element separates the first beam into a third beam containing light in the first wavelength range and a fourth beam containing light in the second wavelength range. The third beam and the fourth beam have complementary polarizations. The second birefringent element also separates the second beam into a fifth beam containing light in the second wavelength range and a sixth beam containing light in the first wavelength range. The fifth beam and the sixth beam have complementary polarizations but the polarizations of the third and fifth beams are substantially the same as each other and the polarizations of the fourth and sixth beams are substantially the same as each other. The polarization rotation device is optically coupled to the second birefringent element. The polarization rotation device rotates the polarization of selected beams of the third, fourth, fifth and sixth beams so that they are properly recombined by the second birefringent element on a return path. The polarization rotation device may be a second waveplate or a non-reciprocal rotator.

The retro-reflector, which is optically coupled to the polarization rotation device, reflects the third, fourth fifth and sixth beams traveling along forward paths from the polarization rotation device back towards the polarization rotator and the second birefringent element along reverse paths. On the reverse path the second birefringent element combines the third beam with the sixth beam to form a first output optical signal containing light in the first wavelength range. The second birefringent element also combines the fourth beam with the fifth beam to form a second output optical signal containing light in the second wavelength range.

The inventive apparatus may operate as either a demultiplexer or multiplexer. In an alternative embodiment, the apparatus includes a switchable polarization rotator disposed between the first birefringent element and the first waveplate. The switchable polarization rotator allows the apparatus to operate as a router by either rotating or not rotating the polarizations of the first and second beams.

BRIEF DESCRIPTION OF THE FIGURES

FIGS. 2A–2D depict a folded optical interleaver according to a first embodiment of the present invention;

FIGS. 2E–2F depict a folded optical interleaver configured to operate as a router according to a second embodiment of the present invention;

FIGS. 3A–3D depict a folded optical interleaver according to a third embodiment of the present invention;

FIGS. 4A–4B depict a folded optical interleaver configured to as a router according to a fourth embodiment of the present invention;

FIGS. 5A–5D depict a folded optical interleaver according to a fifth embodiment of the present invention;

FIGS. 6A–6B depict a folded optical interleaver configured to operate as a router according to a sixth embodiment of the present invention;

DETAILED DESCRIPTION

Figure 1:
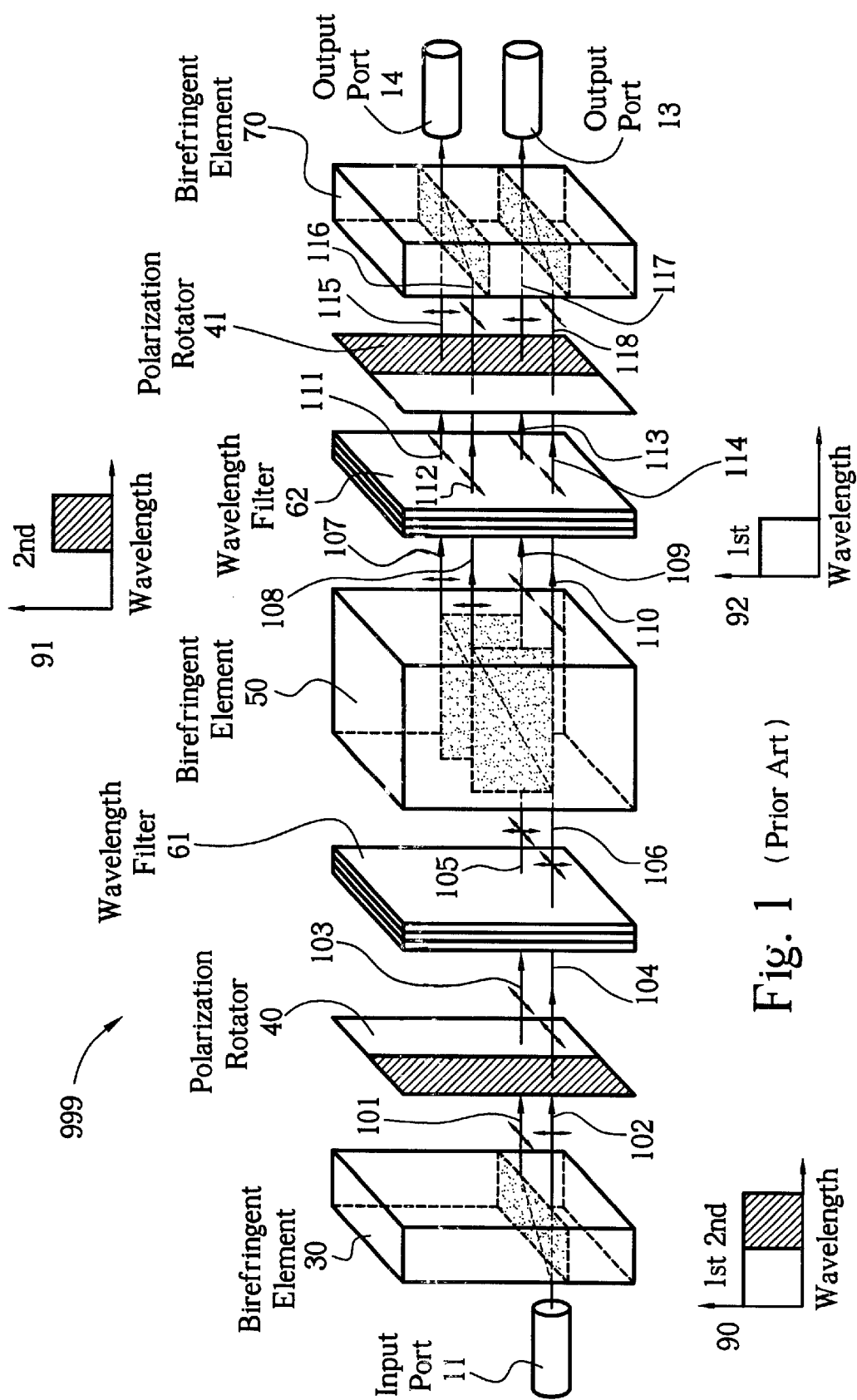
FIG. 1 depicts an optical interleaver according to the prior art.

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

FIGS. 2A–2D depict a first embodiment of the folded interleaver 200 of the present invention. The interleaver 200 generally comprises a first birefringent element 202, a first waveplate 204, a second birefringent element 206, a polarization rotator 210, and a retro reflector 230. The first birefringent element 202 is optically coupled to a first optical input/output (I/O) port 201 and the first waveplate 204. The first waveplate 204 is optically coupled to the second birefringent element 206. The second birefringent element 206 is optically coupled to the polarization rotator 210. The polarization rotator 210 is optically coupled to the retro-reflector 230. Although the elements of the interleaver 200 are depicted as being arranged linearly, those skilled in the art will be able to devise other arrangements without deviating from the scope of these teachings.

The interleaver 200 may operate as either a multiplexer or demultiplexer. FIGS. 2A–2B depict the operation of interleaver 200 as a demultiplexer. In this particular embodiment, I/O port 201 acts as an input and I/O ports 203, 205 act as outputs. For the sake of clarity, the operation has been broken down into two paths, a forward path depicted in FIG. 2A, and a reverse path depicted in FIG. 2B. Light travels from left to right in FIG. 2A and from right to left in FIG. 2B. The operation of the interleaver 200 as a demultiplexer proceeds as follows. As shown in FIG. 2A, an optical signal 240 enters the first birefringent element 202 from the I/O port 201. Optical signal 240 is unpolarized and can be treated as having two complementary polarizations, e.g., a vertical polarization and a horizontal polarization. The first birefringent element 202 walks off a horizontally polarized beam 242 from a vertically polarized beam 241. Of course, the first birefringent element 202 could walk off the vertically polarized beam 241 from the horizontally polarized beam 242 depending on the orientation of an optic axis of the first birefringent element 202.

The vertically and horizontally polarized beams 241, 242 enter waveplate 204. Optical signal 240 typically contains light in two distinct wavelength ranges denoted 1 and 2 respectively in FIGS. 2A and 2B. Wave plate 204 is configured, for example, by appropriate choice of the thickness and material, to rotate the polarization of light in only one of these wavelength ranges, e.g., wavelength range 1. For example, in a crystal-based waveplate, ordinary and extraordinary rays of light travel at different speeds, which results in a phase difference between them. The phase shift is typically a function of wavelength $\lambda$. For certain wavelengths, e.g., those in wavelength range 2, the phase shift of the waveplate is given by 2mπ, where π is an integer. In such a case, the polarization of light in wavelength range 2 will not change after passing through the waveplate. For certain other wavelengths, e.g., those in wavelength range 1, the phase shift might be given by (2m+1) π, resulting in a 90° change in the direction of the polarization for light in wavelength range 1. Thus, for vertically polarized beam 241 light in wavelength range 1 will be rotated from vertical to horizontal and light in wavelength range 2 will remain polarized vertically. For horizontally polarized beam 242 light in wavelength range 1 will be rotated from horizontal to vertical while light in wavelength range 2 remains polarized horizontally.

Beams 241 and 242 enter the second birefringent element 206, where the vertically polarized components are walked off from the horizontally polarized components. Again, the horizontally polarized components could be walked off from the vertically polarized components by appropriate orientation of an optic axis of the second birefringent element 206. The second birefringent element splits beam 241 into a horizontally polarized beam 243, containing light and wavelength range 1, and a vertically polarized beam 245 containing light in wavelength range 2. Similarly, the second birefringent element 206 splits beam 242 into a horizontally polarized beam 244 containing light in wavelength range 2 and a vertically polarized beam 246 containing light in wavelength range 1.

To demultiplex optical signal 240, it is desirable to combine beam 244 with beam 245 and to combine beam 243 with beam 246. It is relatively easy to do this if, for example, beams 244 and 245 are horizontally or vertically adjacent one another. However at this stage, beams 244 and 245 are positioned diagonal to each other as shown in Inset 1 of FIG. 2A. A similar problem exists with beams 243 and 246. Thus, it is necessary to "cross over" beams 244 and 245 or, alternatively, beams 243 and 246.

In the embodiment depicted in FIGS. 2A and 2B, retroreflector 230 crosses over beams 244 and 245 and reflects beams 243, 244, 245, and 246 back through the second birefringent element 206. However, to assure that the beams are properly combined, they must have the right polarizations when entering the second birefringent element 206 on the return path. For example, after emerging from the second birefringent element 206, beams 243, 244, 245, and 246 enter the polarization rotator 210. The polarization rotator 210 rotates the polarization of light from one complementary state to the other, e.g., from horizontal to vertical and vice versa. However, the polarization rotator 210 is shaped so that only beams 244, 245, and 246 pass through it and have their polarizations rotated. Beam 243 passes through a gap 211 in polarization rotator 210 so that beam 243 bypasses the polarization rotator 210 entirely on the forward path. Consequently, upon emerging from the polarization rotator 210, beams 243, 245, and 246 are horizontally polarized and beam 244 is vertically polarized.

Beams 243, 244, 245, and 246 then reflect from retroreflector 230. The retro-reflector 230 reflects beams 243, 244, 245, and 246 back through the polarization rotator 210 and the second birefringent element 206 on the return path shown in FIG. 2B. The retro-reflector 230 also spatially displaces beams 245 and 246 so that they bypass the polarization rotator 210. In the exemplary embodiment depicted, beams 245, 246 pass below the polarization rotator 210. Finally, and perhaps most importantly, the retro-reflector 230 crosses over beams 244 and 243 so that, after emerging from the retro-reflector 230 beam 244 follows a reverse path that is substantially co-linear with the forward path for beam 243 and beam 243 follows a reverse path that is substantially co-linear with the forward path for beam 244.

Figure 8:
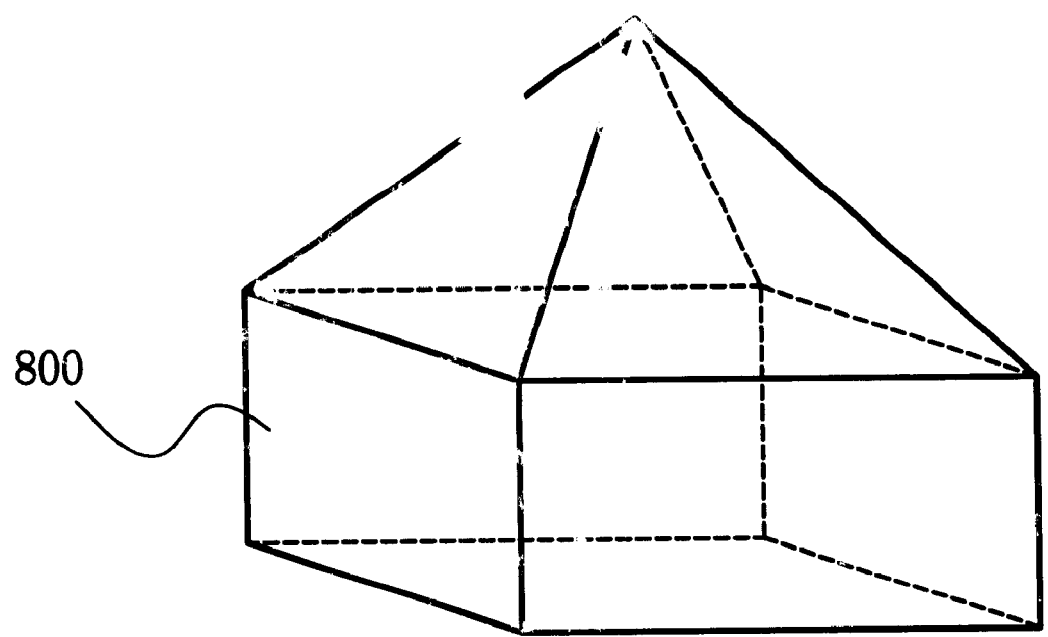
FIG. 8 depicts a retro-reflector suitable for use with embodiments of the interleaver of the present invention;.

The retro-reflector 230 generally comprises a first pair of reflecting surfaces 232, 234 that are oriented substantially perpendicular to each other and a second pair of reflecting surfaces 236, 238 that are oriented substantially perpendicular to each other. An example of a suitable retro-reflector 230 is a totally internally reflecting prism, sometimes referred to as a Porro prism. FIG. 8 depicts an example of a pyramidal prism 800 that may be used as retro reflector 230. Such a reflector may also be used in any of the other embodiments of the present invention. The first pair of reflecting surfaces 232, 234 is substantially perpendicular to the second pair of reflecting surfaces 236, 238. Beams 245 and 246 reflect off reflecting surface 232 towards reflecting surface 234, which reflects them back towards the polarization rotator 210 along a reverse path that is substantially parallel to their forward path. Beam 243 reflects off surface 238 towards surface 236, which reflects beam 243 back along a reverse path substantially collinear with the forward path of beam 244. In a similar fashion, beam 244 reflects off surface 236 towards surface 238, which reflects beam 244 back along a reverse path substantially collinear with the forward path of beam 243.

As set forth above, on the return path depicted in FIG. 2B, beams 245 and 246 bypass the polarization rotator 210. As such, beam 245, containing light in wavelength range 2 and beam 246, containing light in wavelength range 1 both enter the second birefringent element 206 with horizontal polarization. Returning beams 243 and 244 pass back through the polarization rotator 210. Because of retro-reflector 230, beams 243 and 244 have effectively changed places on the return path depicted in FIG. 2B. Consequently beam 243 passes through the polarization rotator 210, which rotates the polarization of beam 243 from horizontal to vertical. Beam 244 bypasses the polarization rotator 210, e.g. by passing through the gap 211. Beam 244 thus remains vertically polarized. Vertically polarized beam 243, containing light in wavelength range 1, and vertically polarized beam 244, containing light in wavelength range 2 then enter the second birefringent element 206.

As the beams 243, 244, 245, and 246 enter the second birefringent element 206, vertically polarized beam 243 is adjacent, e.g., above, horizontally polarized beam 246. Vertically polarized beam 244 is adjacent, e.g., above, horizontally polarized beam 245. A cross-sectional schematic of the relative positions of the four beams at this stage is illustrated in Inset 2 of FIG. 2B. The second birefringent element 206 combines beam 243 with beam 246 to form a first output beam 247 containing light in wavelength range 1. The second birefringent element 206 combines beam 244 with beam 245 to form a second output beam 248 containing light in wavelength range 2. The first waveplate 204 and first birefringent element 202 are shaped so that the output beams 247, 248 bypass them on the return path. For example, first waveplate 204 and first birefringent element 202 each have a height and position that such that output beams 247, 248 pass beneath them as shown in FIG. 2B. Output beam 247 passes under the first waveplate 204 and the first birefringent element 202 and couples to I/O port 203. Output beam 248 passes under the first waveplate 204 and the first birefringent element 202 and couples to I/O port 205. Alternatively, the interleaver 200 may configured such that the output beams 247, 248 pass above or to the side of the first waveplate 204 and the first birefringent element 202. Those of skill in the art will be able to devise other ways for the output beams 247, 248 to bypass the first waveplate 204 and the first birefringent element 202.

In the embodiment depicted in FIGS. 2A–2B, beams 245 and 246 travel a longer path in the second birefringent element 206 than beams 243 and 244 on the forward path. However, on the reverse path, beams 243 and 244 travel a longer path in the second birefringent element 206 than beams 245 and 246. Thus, the four beams 243, 244, 245, and 246 travel equal optical paths in the second birefringent element 206 for the combined forward and reverse paths. However, since the beams only travel once through the first birefringent element and beam 242 travels a longer path than beam 241, which leads to polarization mode dispersion. To correct this, a simple compensation plate may be placed in the path of beam 241 to compensate for the extra optical path of beam 242.

Those skilled in the art will recognize that the interleaver 200 may also operate as a multiplexer by inputting a signal 247' containing light in wavelength range 1 to I/O port 203 and a signal 248' light in wavelength range 2 to I/O port 205. The two beams are combined as a single output beam 240' at I/O port 201. The sequence of steps, shown in FIGS. 2C–2D, then proceeds in the reverse order to that described above with respect to FIGS. 2A–2B. The multiplexer forward path is shown in FIG. 2C and the reverse multiplexer path is shown in FIG. 2D. It should be noted that, in the embodiment depicted in FIGS. 2C–2D, the I/O ports 203, 205 are not equivalent. For example, interleaver 200 will not properly multiplex signals 247', 248' if signal 247' containing light in wavelength range 2 is input to I/O port 205 and signal 248' containing light in wavelength range 1 is input to I/O port 203.

Other configurations of the interleaver 200 are possible. For example, by appropriate orientation of the optic axis of the first birefringent element 202, the polarizations of beams 241 and 242 may be reversed from that shown in FIGS. 2A–2B. In such a case, the normal operation of interleaver 200 will result in beam 247 containing light in wavelength range 2 and beam 248 containing light in wavelength range 1.

By selectively rotating the polarizations of beams 241 and 242, The interleaver 200 may be easily modified to operate as a router according to a second embodiment of the invention. FIGS. 2E–2F depict a router 250 according to a second embodiment of the invention. Most of the elements of the router 250 have features in common with those of interleaver 200 of FIGS. 2A–2D. For example, the router 250 generally comprises a first birefringent element 252, a switchable polarization rotator 253, a first waveplate 254, a second birefringent element 256, a polarization rotator 260, and a retro reflector 270. A first I/O port 255 is optically coupled to the first birefringent element 252 and second and third I/O ports 257, 259 are optically coupled to the second birefringent element 256.

For the sake of clarity, the operation has been broken down into two paths, a forward path depicted in FIG. 2E, and a reverse path depicted in FIG. 2F. Light travels mostly from left to right in FIG. 2E and mostly from right to left in FIG. 2F. The components of the router 250 are optically coupled to each other much like the corresponding components of interleaver 200 and operate in a similar fashion. The first birefringent element 252 splits an input optical signal 280 from I/O port 253 into beams 281 and 282 having complementary polarizations. The first waveplate 254 rotates a polarization of light in a wavelength range 1' but not in a wavelength range 2'. The second birefringent element walks off beams 285, 286 from beams 283, 284 respectively. The polarization rotator 260 rotates the polarizations of beams 284, 285, and 286 on the forward path and beam 283 on the reverse path. Retro-reflector 270 reflects back beams 283 284, 285, and 286 and crosses over beams 283 and 284. The second birefringent element 256 combines beam 283 with beam 286 to form output beam 287 and beam 284 with beam 285 to form output beam 288. Beams 287 and 288 bypass, e.g., pass under, the waveplate 254, the switchable polarization rotator 253 and the first birefringent element 252 on the reverse path towards I/O ports 257 and 259. Output beam 287 couples to I/O port 257 and output beam 288 couples to I/O port 259.

The principal difference between the interleaver 200 and the router 250 is the switchable polarization rotator 253 disposed between the first birefringent element 252 and the waveplate 254. The switchable polarization rotator 253 is switchable between a "0" state and a "1" state. In the "0" state, rotation device 253 does not rotate the polarization of beams 281 and 282. Router 250 then operates substantially as described above with respect to FIGS. 2A–2D. Specifically, beam 287 contains light in wavelength range 1' and beam 288 contains light in wavelength range 2'. In the "1" state, switchable polarization rotator 253 rotates the polarizations of beams 281 and 282 to their complementary states, e.g. from horizontal to vertical and vice versa.

There are several possible ways of switching the state of polarization rotator 253. One way is to mechanically translate a fixed rotator 253 in and out of the path of beams 281, 282. Alternatively, switchable rotator 253 may be a Faraday rotator, liquid crystal, Kerr cell, magneto-optic element, or electro-optic element responsive to an externally applied switching signal.

Those of skill in the art will recognize that by rotating the polarizations of beams 281 and 282 to their complementary states, output beam 287 will contain light of wavelength range 2' and output beam 288 will contain light of wavelength range 1'. To illustrate this, FIGS. 2E–2F, depict router 250 in the "1" state. Furthermore, in the "1" state, router 250 may operate as a multiplexer to combine a signal containing light in wavelength range 2' input to I/O port 257 with a signal containing light in wavelength range 1' input to I/O port 259.

Interleaver and router configurations other than those depicted in FIGS. 2A–2F are consistent with the present invention. For example, FIGS. 3A–3D depict a third embodiment of a folded interleaver 300 of the present invention. The interleaver 300 generally comprises a first birefringent element 302, a first waveplate 304, a second birefringent element 306 a second waveplate 308, a polarization rotator 310, a polarizer 320 and a retro reflector 330. The first birefringent element 302 is optically coupled to a first optical input/output (I/O) port 301 and the first waveplate 304. The first waveplate 304 is optically coupled to the second birefringent element 306. The second birefringent element 306 is optically coupled to the second waveplate 308. The second waveplate 308 is optically coupled to the polarization rotator 310. The polarization rotator 310 is optically coupled to the polarizer 320. The polarizer 320 is optically coupled to the retro-reflector 330. Although the elements of the interleaver 300 are depicted as being arranged linearly, those skilled in the art will be able to devise other arrangements without deviating from the scope of these teachings.

The interleaver 300 may operate as either a multiplexer or demultiplexer. FIGS. 3A–3B depict the operation of interleaver 300 as a demultiplexer. In this particular embodiment, I/O port 301 acts as an input and I/O ports 303, 305 act as outputs. For the sake of clarity, the operation has been broken down into two paths, a forward path depicted in FIG. 3A, and a reverse path depicted in FIG. 3B. Light travels from left to right in FIG. 3A and from right to left in FIG. 3B. The operation of the interleaver 300 as a demultiplexer proceeds as follows. As shown in FIG. 3A, an unpolarized optical signal 340 enters the first birefringent element 302 from the I/O port 301. The first birefringent element 302 walks off the unpolarized optical signal 340 into a horizontally and vertically polarized beams 342, 341. Alternatively, the first birefringent element 302 could walk off a vertically polarized beam from a horizontally polarized beam depending on the orientation of an optic axis of the first birefringent element 302.

The vertically and horizontally polarized beams 341, 342 enter the first waveplate 304. Optical signal 340 typically contains light in two distinct wavelength ranges denoted 1" and 2" respectively in FIGS. 3A and 3B. Wave plate 304 is configured, for example, by appropriate choice of the thickness and material, to rotate the polarization of light in only one of these wavelength ranges, e.g., wavelength range 1" to its complementary state.

Beams 341 and 342 enter the second birefringent element 306, where the vertically polarized components are walked off from the horizontally polarized components. Again, the horizontally polarized components could be walked off from the vertically polarized components by appropriate orientation of an optic axis of the second birefringent element 306. The second birefringent element splits beam 341 into a horizontally polarized beam 343, containing light and wavelength range 1", and a vertically polarized beam 345 containing light in wavelength range 2". Similarly, the second birefringent element 306 splits beam 342 into a horizontally polarized beam 344 containing light in wavelength range 2" and a vertically polarized beam 346 containing light in wavelength range 1".

After emerging from the second birefringent element 306, beams 343, 344, 345, and 346 enter the second waveplate 308. In the embodiment depicted in FIGS. 3A–3D, the second waveplate 308 may be regarded as a wavelength selective polarization rotation device. The second waveplate 308 rotates the polarization of light in wavelength range 1" but not wavelength range 2". Consequently, the second waveplate 308 rotates the polarization of beam 343 from horizontal to vertical and the polarization of beam 346 from vertical to horizontal. Beams 344 and 345, which contain light in wavelength range 2", retain their polarizations.

Beams 343, 344, 345, and 346 then enter polarization rotator 310. The polarization rotator 310 rotates the polarization of light from one complementary state to the other, e.g., from horizontal to vertical and vice versa. The polarization rotator 310 is shaped so that only beams 344, 345, and 346 pass through it and have their polarizations rotated. Beam 343 passes through a gap 311 in polarization rotator 310 so that beam 343 bypasses the polarization rotator 310 entirely. Consequently, beams 344, 345, and 346 are vertically polarized and beam 343 is horizontally polarized.

All four beams 343, 344, 345, and 346 may then optionally pass through the polarizer 320. The polarizer 320 serves to narrow the passbands for wavelength ranges 1" and 2". The polarizer 320 is divided into four sections 323, 324, 325 and 326, which are configured to transmit beams 343, 344, 345, and 346 respectively on the forward path. For example, sections 323, 324, and 326 have polarization axes oriented to transmit vertically polarized light and section 325 has a polarization axis oriented to transmit horizontally polarized light.

Beams 343, 344, 345, and 346 then reflect from retro-reflector 330. The retro-reflector 330 reflects beams 343, 344, 345, and 346 back through the second waveplate 308 and the second birefringent element 306 on the return path shown in FIG. 3B. The retro-reflector 330 also spatially displaces beams 345 and 346 so that they bypass, e.g., pass below, the polarizer 320 and the polarization rotator 310. The retro-reflector 330 also crosses over beams 344 and 343 so that beam 344 follows a reverse path that is substantially co-linear with the forward path for beam 343 and beam 343 follows a reverse path that is substantially co-linear with the forward path for beam 344.

Beam 345, containing light in wavelength range 2" enters the second waveplate 308 with horizontal polarization and beam 346, containing light in wavelength range 1" enters waveplate 308 with vertical polarization. The second waveplate 308 rotates the polarization of beam 346 but not beam 345 so that both beams emerge from the second waveplate 306 horizontally polarized.

Returning beams 343 and 344 pass back through the polarizer 320 towards the polarization rotator 310. Because of retro-reflector 330, beams 343 and 344 have effectively changed places on the return path depicted in FIG. 3B. Consequently beam 343 passes through the polarization rotator 310, which rotates the polarization of beam 343 from vertical to horizontal. Beam 344 bypasses the polarization rotator 310 and remains vertically polarized. Horizontally polarized beam 343, containing light in wavelength range 1" enters the second waveplate and vertically polarized beam 344, containing light in wavelength range 2" enter the second waveplate 308. The second waveplate rotates the polarization of beam 343 but not beam 344. Thus, beams 343 and 344 emerge from the second waveplate 308 vertically polarized.

Beams 343, 344, 345, and 346 then enter the second birefringent element 306. Vertically polarized beam 343 is adjacent, e.g., above, horizontally polarized beam 346. Vertically polarized beam 344 is adjacent, e.g., above, horizontally polarized beam 345. The second birefringent element 306 combines beam 343 with beam 346 to form a first output beam 347 containing light in wavelength range 1". The second birefringent element 306 combines beam 344 with beam 345 to form a second output beam 348 containing light in wavelength range 2". In a manner similar to that described above with respect to FIGS. 2A–2F first waveplate 304 and first birefringent element 302 are shaped so that the output beams 347, 348 bypass them on the return path. A simple compensation plate may be placed in the path of beam 341 to compensate for any extra optical path of beam 342.

The interleaver 300 may also operate as a multiplexer by inputting a signal 347' containing light in wavelength range 1" to I/O port 303 and a signal 348' light in wavelength range 2" to I/O port 305. The interleaver 300 combines two beams 347', 348' to form a single output beam 340' at I/O port 301. The sequence of steps, shown in FIGS. 3C–3D, then proceeds in the reverse order to that described above with respect to FIGS. 3A–3B. The forward multiplexer path is shown in FIG. 3C and the reverse multiplexer path is shown in FIG. 3D.

According to a fourth embodiment of the invention, the interleaver 300 may be easily modified to operate as a router. FIGS. 4A–4B depict a router 400 having features in common with interleaver 300 of FIGS. 3A–3D. The router 400 generally comprises a first birefringent element 402, a switchable polarization rotator 407, a first waveplate 404, a second birefringent element 406 a second waveplate 408, a polarization rotator 410, a polarizer 420 and a retro reflector 430. A first I/O port is optically coupled to the first birefringent element 402 and second and third I/O ports 403, 405 are optically coupled to the second birefringent element 406. As with the embodiment depicted in FIGS. 3A–3D, the second birefringent element 406 may be regarded as a wavelength selective polarization rotation device. Light travels from left to right on forward paths in FIG. 4A and from right to left along reverse paths in FIG. 4B. The components of the router 400 are optically coupled to each other much like the corresponding components of interleaver 300 and operate in a similar fashion. The first birefringent element 402 splits an input optical signal 440 from I/O port 401 into beams 441 and 442 having complementary polarizations. The first waveplate 404 rotates a polarization of light in a wavelength range 1''' but not in a wavelength range 2'''. The second birefringent element walks off beams 445, 446 from beams 443, 444 respectively. The second waveplate 408 rotates a polarization of light in a wavelength range 1''' but not in a wavelength range 2'''. The polarization rotator 410 rotates the polarizations of beams 444, 445, and 446 on the forward path and beam 443 on the reverse path. Polarizer 420 narrows the passband for wavelength ranges 1''' and 2'''. Retro-reflector 430 reflects back beams 443 444, 445, and 446 and crosses over beams 443 and 444. The second waveplate 408 rotates the polarization of light in wavelength range 1''' on the reverse path. The second birefringent element 406 combines beam 443 with beam 446 to form output beam 447 and beam 444 with beam 445 to form output beam 448. Beams 447 and 448 bypass first waveplate 404, switchable polarization rotator 407 and first birefringent element 402 on the reverse path towards I/O ports 403 and 405. Output beam 447 couples to I/O port 403 and output beam 448 couples to I/O port 405.

The switchable polarization rotator 407 may have features in common with the switchable polarization rotator 253 of router 250. For example, the switchable polarization rotator 407 may be switchable between a "0" state and a "1" state. In the "0" state, rotation device 407 does not rotate the polarization of beams 441 and 442. Router 400 then operates substantially as described above with respect to FIGS. 3A–3D. Specifically, beam 447 contains light in wavelength range 1''' and beam 448 contains light in wavelength range 2'''. In the "1" state, switchable polarization rotator 407 rotates the polarizations of beams 441 and 442 to their complementary states, e.g. from horizontal to vertical and vice versa. By rotating the polarizations of beams 441 and 442 to their complementary states, output beam 447 will contain light of wavelength range 2''' and output beam 448 will contain light of wavelength range 1'''. To illustrate this, FIGS. 4A–4B, depict router 400 in the "1" state. Furthermore, in the "1", router 400 may operate as a multiplexer to combine a signal containing light in wavelength range 2''' input to I/O port 403 with a signal containing light in wavelength range 1''' input to I/O port 405.

Other possible configurations are possible for interleavers and routers of the type shown above. For example, the second waveplate of interleavers 200, 300 or routers 250, 400 may be replaced with a Faraday rotator. For the purposes of this application, both Faraday rotators and waveplates may both be regarded as polarization rotation devices. FIGS. 5A–5D depict an interleaver 500 according to a fifth embodiment of the present invention. The interleaver 500 generally comprises a first birefringent element 502 a waveplate 504 a second birefringent element 506 a non-reciprocal rotator 509 and a retro-reflector 530. The interleaver 500 typically includes three optical I/O ports 501, 503, and 505.

The interleaver 500 may operate as either a multiplexer or demultiplexer. FIGS. 5A–5B depict the operation of interleaver 500 as a demultiplexer and FIGS. 5C–5D depict the operation of interleaver 500 as a multiplexer. In the demultiplexer embodiment, I/O port 501 acts as an input and I/O ports 503, 505 act as outputs. A forward demultiplexing path is depicted in FIG. 5A, and a reverse path depicted in FIG 5B. Light travels from left to right in FIG. 5A and from right to left in FIG. 5B. An optical signal 540 from the first I/O port 501 enters the first birefringent element 502. Optical signal 540 contains light having two complementary polarizations, e.g. a vertical polarization and a horizontal polarization. The optical signal 540 contains two subsignals, each sub-signal containing light in one of two distinct wavelength ranges 1'''' and 2''''. The first birefringent element 502 walks off a horizontally polarized beam 542 from a vertically polarized beam 541. Of course, the first birefringent element 502 could walk off the vertically polarized beam 541 from the horizontally polarized beam 542 depending on the orientation of an optic axis of the first birefringent element 502. As with the embodiments depicted in FIGS. 2A–4B above, a simple correction plate may be placed in the path of beam 541 to compensate for the extra optical path of beam 542.

Wave plate 504 rotates the polarization of light in only one of these wavelength ranges, e.g. wavelength range 1''''. Thus, for vertically polarized beam 541 light in wavelength range 1'''' will be rotated from vertical to horizontal and light in wavelength range 2'''' will remain polarized vertically. For horizontally polarized beam 542 light in wavelength range 1'''' will be rotated from horizontal to vertical while light in wavelength range 2'''' remains polarized horizontally.

Beams 541 and 542 enter the second birefringent element 506, where the vertically polarized components are walked off from the horizontally polarized components. The second birefringent element 506 splits beam 541 into a horizontally polarized beam 543, containing light and wavelength range 1'''', and a vertically polarized beam 545 containing light in wavelength range 2''''. Similarly, the second birefringent element 506 splits beam 542 into a horizontally polarized beam 544 containing light in wavelength range 2'''' and a vertically polarized beam 546 containing light in wavelength range 1''''.

After emerging from the second birefringent element 506, beams 543, 544, 545, and 546 enter the non-reciprocal rotator 509. The non-reciprocal rotator may be a Faraday rotator or other device that rotates the polarization of light in the same sense on both the forward and reverse paths. In the embodiment shown, the non-reciprocal rotator 509 rotates the polarization of each beam 543, 544, 545, and 546 by 45° in the direction shown by the arrow 511 on both the forward and reverse paths. The beams 543, 544, 545, and 546 emerge from the reciprocal rotator 509 and reflect from retro-reflector 530.

The retro-reflector 530 may be of a type having features in common with the retro-reflector 230 described above with respect to FIGS. 2A–2F. In general, the retro-reflector 530 reflects beams 543, 544, 545, and 546 back through the reciprocal rotator 509 and the second birefringent element 506 on the reverse path shown in FIG. 5B. The retro-reflector 530 also spatially displaces beams 545 and 546. The retro-reflector 530 also crosses over beams 543 and 544 so that beam 544 follows a reverse path that is substantially co-linear with the forward path for beam 543 and beam 543 follows a reverse path that is substantially co-linear with the forward path for beam 544.

It is often desirable that the light in beams 543, 544, 545, and 546 be polarized perpendicular to the plane of incidence with the surface of retro-reflector 530 from which they reflect. This optimizes the intensity of reflected light. To properly align the polarizations, a reciprocal polarization rotator 521 may be optionally included between the non-reciprocal rotator 509 and the retro-reflector 530. By way of example, the reciprocal rotator 521 rotates the polarizations of beams 543, 544, 545, and 546 by 45° in the sense shown by arrow 511 on the forward path and by 45° in the opposite sense of arrow 511 on the reverse path. In this manner beams 543, 544, 545, and 546 re-enter the reciprocal rotator 509 on the reverse path with the same polarization orientations with which they left it on the forward path.

On the reverse path, the non-reciprocal polarization rotator 509 rotates beams 543, 544, 545, and 546 so that they all have the same polarization state that they had when they entered the non-reciprocal rotator 509 on the forward path. For example, in the embodiment depicted in FIGS. 5A and 5B, the polarization rotator 509 rotates the polarization of beams 543, 544, 545, and 546 by 45° in the sense of the arrow 511 so that beams 543 and 544 are vertically polarized and beams 545 and 546 are horizontally polarized. Those skilled in the art will be able to devise other polarization configurations for beams 543, 544, 545, and 546.

Because of the crossover reflection by retro-reflector 530 the beams 543, 546 containing light in wavelength range 1"" are adjacent each other as they enter the second birefringent element 506 on the return trip. Beams 544, 545 containing light in wavelength range 2"" are also adjacent each other as they enter the second birefringent element 506 on the return path.

On the return path, the second birefringent element 506 combines beam 543 with beam 546 to form a first output beam 547 containing light in wavelength range 1"". The second birefringent element 506 combines beam 544 with beam 545 to form a second output beam 548 containing light in wavelength range 2"". The output beams 547 and 548 bypass the first waveplate 504 and the first birefringent element 502 on the return path. Output beam 547 couples to I/O port 503. Output beam 548 couples to I/O port 505. Those skilled in the art will recognize that the interleaver 500 may also operate as a multiplexer by inputting a beam 547' containing light in wavelength range 1" to I/O port 503 and a beam 548' containing light in wavelength range 2"" to I/O port 505. The sequence of steps, shown in FIGS. 5C–5D, then proceeds in the reverse order to that described above with respect to FIGS. 5A–5B.

Other configurations of the interleaver 500 are possible. For example, by appropriate orientation of the optic axis of the first birefringent element 502, the polarizations of beams 541 and 542 may be reversed. In such a case, the normal operation of interleaver 500 will result in beam 547 containing light in wavelength range 2 and beam 548 containing light in wavelength range 1.

According to a sixth embodiment of the invention, the interleaver 500 may be easily modified to operate as a router 600 having features in common with the routers 250, 400 of FIGS. 2E–2F and 4A–4B. As depicted in FIGS. 6A–6B the router 600 has features in common with the interleaver 500. The router 600 generally comprises a first birefringent element 602, a switchable polarization rotator 607, a non-reciprocal rotator 609 and a retro reflector 630. The router 600 may optionally include a polarization rotator 621 disposed between the non-reciprocal rotator 609 and the retro-reflector 630. A first I/O port is optically coupled to the first birefringent element 602 and second and third I/O ports 603, 605 are optically coupled to the second birefringent element 606.

Light travels from left to right along forward paths in FIG. 6A and from right to left along reverse paths in FIG. 6B. The components of the router 600 are optically coupled to each other much like the corresponding components of interleaver 500 and operate in a similar fashion. The first birefringent element 602 splits an input optical signal 640 from I/O port 601 into beams 641 and 642 having complementary polarizations. The first waveplate 604 rotates a polarization of light in a wavelength range 1""0 but not in a wavelength range 2"". The second birefringent element walks off beams 645, 646 from beams 643, 644 respectively. The non-reciprocal rotator waveplate 609 rotates the polarization of light in the same sense on both the forward and reverse paths. In the embodiment shown, the non-reciprocal rotator 609 rotates the polarization of each beam 643, 644, 645, and 646 by 45° in the direction shown by the arrow 611 on both the forward and reverse paths as described above with respect to FIGS. 5A–5D. The beams 643, 644, 645, and 646 emerge from the non-reciprocal rotator 609 and reflect from retro-reflector 630. Retro-reflector 630 reflects back beams 643 644, 645, and 646 and crosses over beams 643 and 644. The second birefringent element 606 combines beam 643 with beam 646 to form output beam 647 and beam 644 with beam 645 to form output beam 648. Beams 647 and 648 bypass first waveplate 604, switchable polarization rotator 607 and first birefringent element 602 on the reverse path towards I/O ports 603 and 605. Output beam 647 couples to I/O port 603 and output beam 648 couples to I/O port 605.

The switchable polarization rotator 607 switches the router between a "0" state and a "1" state. In the "0" state, rotation device 607 does not rotate the polarization of beams 641 and 642. Router 600 then operates as described above with respect to FIGS. 5A–5B. Specifically, beam 647 contains light in wavelength range 1"" and beam 648 contains light in wavelength range 2"". In the "1" state, switchable polarization rotator 607 rotates the polarizations of beams 641 and 642 to their complementary states, e.g. from horizontal to vertical and vice versa. Those of skill in the art will recognize that by rotating the polarizations of beams 641 and 642 to their complementary states, output beam 647 will contain light of wavelength range 2"" and output beam 648 will contain light of wavelength range 1"". To illustrate this, FIGS. 6A–6B, depict router 600 in the "1" state.

Figure 7:
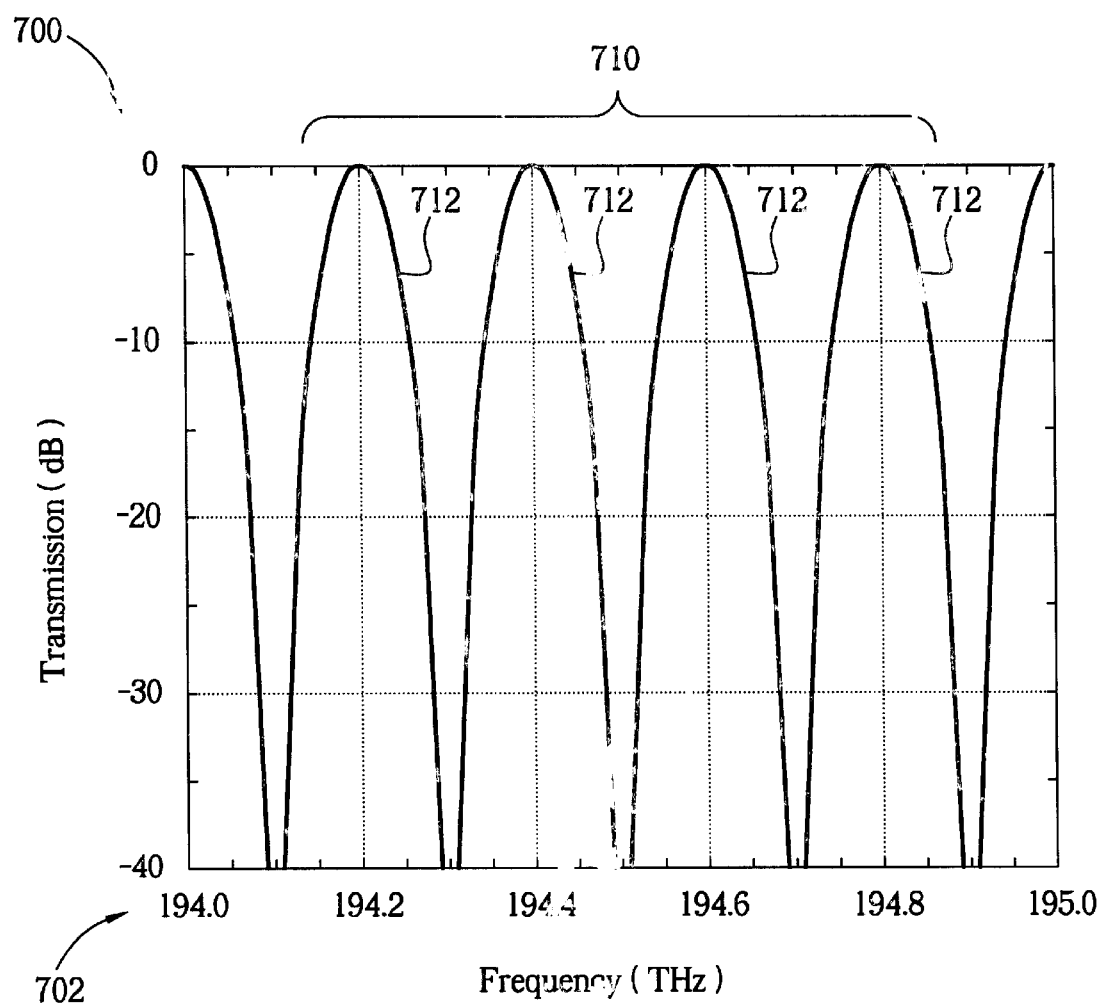
FIG. 7 depicts an exemplary spectral response for an optical interleaver according to an embodiment of the present invention.

The interleavers and routers described above separate or combine optical signals in two distinct wavelength ranges. These two wavelength ranges may define two or more distinct optical channels. FIG. 7 depicts a typical spectral response for a demultiplexer that uses birefringent waveplates, such as the waveplates 204, 304, 404, 504, 604 described above. In FIG. 7 transmission 700 is plotted as a function of frequency 702. The spectral response is characterized by two or more passbands 710 separated by a well-defined channel spacing. Alternating passbands may grouped as one or more channels 712. The channels 712 may define a first wavelength range. The interleaver may be further characterized by a second set of passbands (not shown) having peaks that lie between the peaks of passband 710. Such a second set of passbands may define a second wavelength range. Embodiments of the interleavers and routers of the present invention may be used to separate or combine even and odd channels such as those shown in FIG. 7.

It may be desirable to narrow the passbands in the spectral response of the interleaver. For this purpose an apodizing or trimming filter may be included in the interleaver. The passbands depicted in FIG. 7 have rounded tops. The tops of the passbands for the even channels 712 and/or odd channels 713 may be flattened through the use of a flattening filter. Exemplary trimming and flatting filters are described in detail in commonly assigned U.S. patent application Ser. No. 09/534,755 entitled "Wavelength Slicer for Optical Signal Switching" to Hongtao Hou and Qin Zhong, which is incorporated herein by reference.

The routers and interleavers described above use only a small number of components and are simple to align. It will be clear to one skilled in the art that the above embodiment may be altered in many ways without departing from the scope of the invention. For example, the retro-reflector 230 may introduce a phase difference due to a slightly longer path of beams 245, 246 compared to beams 243, 244. If necessary, a compensation plate may be included in the path of beams 243, 244 to correct for any difference in phase. Accordingly, the scope of the invention should be determined by the following claims and their legal equivalents.

What is claimed is:

1. An optical interleaver apparatus, comprising:
   (a) a first birefringent element, having an optic axis oriented such that the first birefringent element separates an input optical signal into a first beam having a first polarization and a second beam having a second polarization;
   (b) a first waveplate optically coupled to the first birefringent element, wherein the first waveplate rotates a polarization of light in a first wavelength range, but not a second wavelength range;
   (c) a second birefringent element optically coupled to the first waveplate, wherein the second birefringent element separates the first beam into a third beam containing light in the first wavelength range and a fourth beam containing light in the second wavelength range, wherein the third beam and the fourth beam have complementary polarizations; wherein the second birefringent element separates the second beam into a fifth beam containing light in the second wavelength range and a sixth beam containing light in the first wavelength range, wherein the fifth beam and the sixth beam have complementary polarizations but the polarizations of the third and fifth beams are substantially the same as each other and the polarizations of the fourth and sixth beams are substantially the same as each other;
   (d) a polarization rotation device optically coupled to the second birefringent element; and
   (e) at least one retro-reflector optically coupled to the polarization rotation device, wherein the at least one retro-reflector reflects the third, fourth fifth and sixth beams traveling along forward paths from the polarization rotation device back towards the polarization rotation device and the second birefringent element along reverse paths such that the second birefringent element combines the third beam with the sixth beam to form a first output optical signal and the second birefringent element combines the fourth beam with the fifth beam to form a second output optical signal.

2. The apparatus of claim 1 wherein the polarization rotation device rotates the polarizations of the third, fourth, fifth and sixth beams such that when traveling though the second birefringent element along the reverse paths, each of the third, fourth, fifth and sixth beams has a polarization complementary to the polarization it had when traveling through the second birefringent element along the forward path.

3. The apparatus of claim 1 wherein the polarization rotation device comprises a reciprocal rotator.

4. The apparatus of claim 1 wherein the polarization rotation device comprises a second waveplate configured to rotate a polarization of light in the first and second beams in a first wavelength range, the waveplate does not to rotate a polarization of light in the first and second beams in a second wavelength range.

5. The apparatus of claim 4, further comprising a reciprocal rotator that, on the forward paths, rotates the polarizations of the fourth, fifth and sixth beams, but not the third beam.

6. The apparatus of claim 5 wherein the reciprocal rotator rotates the polarizations of the third beam but not the fourth, fifth and sixth beams on the reverse paths.

7. The apparatus of claim 1 wherein the retro-reflector comprises multiple reflecting surfaces.

8. The apparatus of claim 7 wherein the retro-reflector and polarization rotator are configured such that light from at least one of the third, fourth, fifth and sixth beams incident one or more of the multiple reflecting surfaces is polarized along a direction substantially parallel to a plane of one of the reflecting surface.

9. The apparatus of claim 7 wherein the multiple reflecting surfaces include a pair of reflecting surfaces configured to reflect the third beam back substantially along a forward path of the fifth beam and to reflect the fifth beam back substantially along a forward path of the third beam.

10. The apparatus of claim 7 wherein the multiple reflecting surfaces further include a pair of reflecting surfaces that reflect the fourth and sixth beams back along reverse paths that are substantially parallel to the forward paths of the fourth and sixth beams.

11. The apparatus of claim 1 further comprising at least one input optically coupled to the first birefringent element.

12. The apparatus of claim 1 further comprising at least two outputs optically coupled to the second birefringent element.

13. The apparatus of claim 1 further comprising a controllable polarization rotator disposed between the first birefringent element and the second birefringent element.

14. The apparatus of claim 13 wherein the controllable polarization rotator is switchable between a first state, in which the controllable rotator rotates a polarization of light in the first and second beams, and a second state in which it does not rotate a polarization of light in the first and second beams.

15. The apparatus of claim 14 wherein, when the controllable rotator is in the first state the first optical output-signal couples to a first output and the second optical output signal couples to a second output.

16. The apparatus of claim 15 wherein when the controllable rotator is in the second state the first optical output signal couples to the second output and the second optical output signal couples to the first output.

17. An optical interleaver method, comprising:
   (a) separating at least one input optical signal into a first beam having a first polarization and a second beam having a second polarization; and
   (b) rotating a polarization of light in the first and second beams in a first wavelength range, but not a second wavelength range;
   (c) separating the first beam into a third beam containing light in the first wavelength range and a fourth beam containing light in the second wavelength range, wherein the third beam and the fourth beam have complementary polarizations;

(d) separating the second beam into a fifth beam containing light in the second wavelength range and a sixth beam containing light in the first wavelength range, wherein the fifth beam and the sixth beam have complementary polarizations but the polarizations of the third and fifth beams are substantially the same as each other and the polarizations of the fourth and sixth beams are substantially the same as each other;

(e) reflecting the third, fourth fifth and sixth beams traveling along forward paths back along reverse paths;

(f) combining the third beam with the sixth beam to form a first output optical signal; and (g) combining the fourth beam with the fifth beam to form a second output optical signal.

18. The method of claim 17 further comprising rotating the polarizations of the third, fourth, fifth and sixth beams such that when traveling along the reverse paths, each of the third, fourth, fifth and sixth beams has a polarization complementary to the polarization it had when traveling along the forward path.

19. The method of claim 17 further comprising rotating, on the forward paths, the polarizations of the fourth, fifth and sixth beams, but not the third beam.

20. The method of claim 19 further comprising rotating, on the reverse paths, the polarizations of the third beam but not the fourth, fifth and sixth beams.

21. The method of claim 17 wherein step (e) includes reflecting each of the third, fourth, fifth and sixth beams from two or more reflecting surfaces.

22. The method of claim 21 wherein light from at least one of the third, fourth, fifth and sixth beams incident on at least one of the two or more reflecting surfaces is polarized along a direction substantially parallel to a plane of one of the reflecting surface.

23. The method of claim 17 wherein step (e) includes reflecting the third beam back substantially along a forward path of the fifth beam and reflecting the fifth beam back substantially along a forward path of the third beam.

24. The method of claim 17 wherein step (e) includes reflecting the fourth and sixth beams back along reverse paths that are substantially parallel to the forward paths of the fourth and sixth beams.

25. The method of claim 17 further comprising routing the first and second output signals amongst a first and a second output.

* * * * *